(12) United States Patent
Shao et al.

(10) Patent No.: US 7,981,255 B2
(45) Date of Patent: Jul. 19, 2011

(54) METHOD FOR PRODUCING (METH)ACRYLIC ACID AND (METH)ACRYLIC ESTERS

(75) Inventors: Jingming Shao, Shanghai (CN); Jun Yin, Shanghai (CN); Shuju Liu, Shanghai (CN); Xiaodong Chu, Shanghai (CN); Shengxian Xu, Shanghai (CN)

(73) Assignee: Shanghai HuaYi Acrylic Acid Co., Ltd., Shanghai (CN)

( * ) Notice: Subject to any disclaimer, the term of this patent is extended or adjusted under 35 U.S.C. 154(b) by 848 days.

(21) Appl. No.: 11/861,883

(22) Filed: Sep. 26, 2007

(65) Prior Publication Data
US 2009/0078558 A1    Mar. 26, 2009

(51) Int. Cl.
*B01D 3/42* (2006.01)
*C07C 51/44* (2006.01)

(52) U.S. Cl. ............ 203/2; 203/8; 203/9; 203/DIG. 21; 560/218; 562/600

(58) Field of Classification Search .............. 203/2, 8, 203/9, DIG. 21; 560/218; 562/600
See application file for complete search history.

(56) References Cited

U.S. PATENT DOCUMENTS

| | | | | |
|---|---|---|---|---|
| 5,143,585 | A * | 9/1992 | Ichikawa et al. | 203/2 |
| 6,228,227 | B1 * | 5/2001 | Herbst et al. | 203/59 |
| 6,787,001 | B2 * | 9/2004 | Sakamoto et al. | 203/2 |
| 7,150,809 | B2 * | 12/2006 | Diehl et al. | 203/8 |
| 7,300,555 | B2 * | 11/2007 | Schroeder | 203/1 |

OTHER PUBLICATIONS

Chemical Engineering Handbook, published by Mechanical Industry Press (1999).
Chopey, Nicholas P. Handbook of Chemical Engineering Calculations, Third Edition (2004).

* cited by examiner

*Primary Examiner* — Virginia Manoharan
(74) *Attorney, Agent, or Firm* — Hamre, Schumann, Mueller & Larson, P.C.

(57) ABSTRACT

There is provided a method for rectifying a vinyl compound liquor. The method includes the steps of a) providing a rectification column operated at a temperature and pressure and b) feeding the vinyl compound liquor to be rectified into the rectification column, wherein the pressure of the rectification column and the temperature of the fed vinyl compound liquor are controlled, such that the temperature of the fed vinyl compound liquor ranges from its bubble point at the pressure of the rectification column to 10° C. lower than the bubble point.

8 Claims, No Drawings

METHOD FOR PRODUCING (METH)ACRYLIC ACID AND (METH)ACRYLIC ESTERS

TECHNICAL FIELD

The present invention relates to a method for rectifying a vinyl compound, more particularly, to a method for preventing the vinyl compound from spontaneous polymerization during its rectification process. The present methods are particularly suitable for rectifying acrylic compound, for example, acrylic esters, such as methyl acrylate.

BACKGROUND

The vinyl compound is a kind of important chemical raw material, the polymeric characteristic of its unsaturated double bond (active vinyl) makes the vinyl compound to be used as a polymerization monomer to prepare various polymers.

The vinyl compound obtained by chemical synthesis or separation process usually contains various impurities. It is necessary to remove the impurities from the vinyl compound by rectification since they will negatively effect the sequent polymerization process.

However, the vinyl compound tends to proceed frequently undesired spontaneous polymerization under the high temperature and the high pressure during its rectification. Taking the methyl (meth)acrylate, for example, because of the $\alpha,\beta$-unsaturated double bond (active vinyl), it has a tendency to proceed free radical polymerization, especially tends to polymerize spontaneously (i.e., spontaneous polymerization) under the effect of heat or light. Polymers formed by the spontaneous polymerization during rectification will deposit on the surface of the evaporator (because of its high temperature, the probability of forming the polymer is increased), thereby undesirably deteriorating heat transfer and clogging internals of the rectification column, causing unwanted pressure loss, and finally resulting in the stoppage of the rectification column. The interruption of the operation is unavoidable during rectifying the vinyl compound, therefore, to laboriously remove polymers formed.

In order to ensure a stable and continuous operation of the vinyl compound-rectification column for a long period of time, the prior art has developed methods for preventing clogging, such as a method of blowing a gas having a polymerization inhibiting action, or adding a sort or sorts of known polymerization inhibitors thereinto. Conventional polymerization inhibitors (hereinafter referred to as "inhibitor") include N-oxyl compounds such as tert-butyl nitroxide, 2,2,6,6-tetramethyl-4-hydroxypiperidyl-1-oxyl, 2,2,6,6-tetramethylpiperidyl-1-oxyl, 2,2,5,5-tetramethyl-1-oxyl-pyrrolidine, 2,2,6,6-tetramethylpiperidino-oxyl and 4-hydroxy-2,2,6,6-tetramethylpiperidino-oxyl; phenol compounds such as hydroquinone, methoquinone, pyrogallol, catechol and resorcin; phenothiazine compounds such as phenothiazine, 3,7-dioctyl phenothiazine and bis-($\alpha$-dimethylbenzyl)phenothiazine; and copper compounds such as cupric chloride, copper acetate, copper carbonate, copper acrylate, copper dimethyldithiocarbamate, copper diethyldithiocarbamate and copper dibutyldithiocarbamate; as well as manganese salt, etc.

Polymerization is a complex chemical reaction procedure, which usually comprises the following three steps: chain initiation, chain growth, and implosion. Firstly, the monomer produces living free radicals under the effect of light, heat, or initiator. When one of the free radicals collides with another monomer molecule, a reaction occurs, forming new free radicals that are multiples of the monomer molecules to proceed chain growth process. When the spontaneous polymerization of the monomer proceeds to a certain degree, the process stream will become viscous, the popcorn type polymers tend to be formed easily and the phenomenon of implosion is likely to be observed. The formation mechanism of popcorn type polymer is comparatively complex, any of the tiny particles in popcorn type in the raw materials, the rusts or the burrs remained on the surface of the process pipe may initiate the formation and quick propagation of the popcorn type polymer. The key for preventing the spontaneous polymerization is to control the chain propagation, which can be attained by the addition of various high efficient inhibitors. The oxygen in the air itself is not only an efficient inhibitor, but also can make the other inhibitors performing their function of preventing polymerization to the greatest extent as well.

However, even if the above methods have been used, the phenomenon of spontaneous polymerization during rectifying the vinyl compound, such as methyl (meth)acrylate, will still frequently occur, although the spontaneous polymerization has somewhat been inhibited as compared to the rectifying process without the above methods. As a result, it is difficult to ensure a stable and continuous operation of the vinyl compound-rectification column for a long period of time, needing to remove the polymer formed by the spontaneous polymerization from the rectification column periodically.

Accordingly, it is still necessity to develop a method for rectifying vinyl compound, which method is capable of preventing the vinyl compound from spontaneous polymerization during its rectification process.

SUMMARY OF THE INVENTION

An object of the present invention is to provide a method for rectifying the vinyl compound, which method is capable of preventing said vinyl compound from spontaneous polymerization during its rectification process.

In one aspect, the present invention provides a method for rectifying a vinyl compound liquor, comprising:

a) providing a rectification column operated at a certain temperature and pressure;

b) feeding thereinto a vinyl compound liquor to be rectified;

characterized in that the pressure of said rectification column and the temperature of said fed vinyl compound liquor are controlled such that the temperature of said fed vinyl compound liquor is in the range of from its bubble point at the pressure of said rectification column to 10° C. lower than said bubble point.

PREFERRED EMBODIMENTS FOR CARRYING OUT THE INVENTION

The object of the present invention is to prevent the vinyl compound from spontaneous polymerization during its rectification process to avoid clogging the conduits.

From the viewpoint of economy, when the overhead output in a rectification column is more than its bottom discharge, the conventional rectification process in the art usually feeds the vinyl compound liquor into the rectification column at its dew point for reducing energy consumption.

As used herein, the term "dew point" is intended to mean the temperature at which the atmosphere is saturated with the vapor of the vinyl compound liquor to be rectified.

However, there is a disadvantage, the vinyl compound liquor to be rectified being spontaneous polymerized, in the dew point feeding process in the prior art. Commonly, the vapor stream rich in lower boiling point components will go upwards to the top of the rectification column, and then be cooled and condensed. The condensates will go downwards from the top of the rectification column, contacting the vapor stream raised upwards from the bottom of the rectification column, and thus resulting in the lower boiling point components contained therein vaporized while the higher boiling point components condensed and liquefied. As a result, the rectification column can improve the purity of the lower boiling point components in the overhead vapor while improve the purity of the higher boiling point components in the bottom discharge of the rectification column. However, it is difficult for such a process to prevent the vinyl compound from polymerization even if the air is blown and an inhibitor is added to the rectification column, because, according to the conventional economical design of the rectification process, the vinyl compound will be fed to the rectification column at its dew point, the vinyl compound will flash, viz. phase change, immediately after it is fed into the rectification column. Finally, a large quantity of the vapor will be condensed during its way going upwards. Because of the inhibitor being added in the fed vinyl compound liquor, the content thereof in the gas phase flashed is low; and because of a great deal of the vapor being condensed, the distribution of the inhibitor between the gas phase and liquid phase is unequal, resulting in implosion.

Due to the disadvantage existing in the dew point feeding process in the prior art, on research, the inventors of the present invention find that the disadvantage can be avoided by feeding the vinyl compound liquor into the rectification column in the temperature around the bubble point thereof when the overhead output in the rectification column is more than the bottom discharge. The present invention has been completed in the basis of said finding.

As used herein, the term "bubble point" is intended to refer to such a temperature in a certain pressure at which the vinyl compound liquor to be rectified begins to bubble up.

The bubble point of the vinyl compound liquor depends on its composition. Vinyl compound liquors having different compositions will have different bubble points. The bubble point of a vinyl compound liquor can be obtained by experimental test or by theoretical estimation. The method for testing or estimating the bubble point is well known in the art, generally it can be obtained from chemical handbooks. For example, *Chemical Engineer Handbook* published by Mechanical Industry Press, as well as *Handbook of Chemical Engineering Calculations* published by Petro-chemical press, etc.

As used herein, the term "vinyl compound" is intended to refer to such a compound that contains an α,β-ethylenically unsaturated bond, its unrestricted examples are, for example, acrylic compound, such as (meth)acrylic acid, (meth)acrylate salt and (meth)acrylic ester.

Said (meth)acrylic acid comprises acrylic acid and methacrylic acid.

Said (meth)acrylate salt comprises potassium salt, sodium salt, and ammonium salt of the acrylate and methacrylate.

Said (meth)acrylic ester comprises $C_{1-10}$ alkyl methacrylate and $C_{1-10}$ alkyl acrylate, preferably $C_{1-6}$ alkyl methacrylate and $C_{1-6}$ alkyl acrylate, more preferably $C_{1-14}$ alkyl methacrylate and $C_{1-14}$ alkyl acrylate. The unrestricted examples thereof include methyl methacrylate and methyl acrylate, ethyl methacrylate and ethyl acrylate, n-propyl methacrylate and n-propyl acrylate, n-butyl methacrylate and n-butyl acrylate, tert-butyl methacrylate and tert-butyl acrylate, as well as the mixtures of two or more of them. The methyl methacrylate and methyl acrylate (hereinafter referred to as "methyl (meth) acrylate") are preferred.

Because of the vinyl compound, such as methyl (meth) acrylate, being easily to proceed a polymerization, it is required that the operating temperature and operating pressure of the rectification column are preferably set as low as possible. For example, in the process for rectifying a liquor containing (meth)acrylic acid and (meth)acrylic esters, the operation temperature of the rectification column is preferably about 60~100° C. under the pressure of about 1~65 kPa.

The method for rectifying the vinyl compound liquor in the present invention comprises a step of providing a rectification column operated in a certain temperature and pressure.

The rectification column suitable for the rectification method of the present invention is not particularly restricted, it can be any conventional ones as long as the rectification column can withstand the operating temperature and pressure for rectifying the present vinyl compound liquor.

The operation conditions of the rectification column of the present invention can be any of those conventional in the art. The operating temperature of the rectification column suitable for the rectification method of the present invention is usually in the range of from 40 to 130° C., preferably from 50 to 120° C., and more preferably from 60 to 110° C. The operating pressure of rectification column suitable for the rectification method of the present invention is usually in the range of from 1 to 80 kPa, preferably from 30 to 70 kPa, and more preferably from 45 to 60 kPa.

The present method for rectifying the vinyl compound liquor further comprises the step of adding into the rectification column the vinyl compound liquor to be rectified.

The method for adding the vinyl compound liquor has no particular limit, it can be any conventional methods in the art.

The vinyl compound liquor to be rectified in the rectification column can be that obtained directly from its synthesis process. In such a liquor, the concentration of the vinyl compound has no particular limit as long as it can be efficaciously rectified by the method of the present invention. In one embodiment of the present invention, the concentration of the vinyl compound is usually from 40 to 95 wt %, preferably from 60 to 92 wt %, and more preferably from 80 to 90 wt %.

In order to improve the effect of preventing the polymerization, normally, a polymerization inhibitor is added into the vinyl compound liquor obtained directly from its synthesis process. Based on the total weight of the liquor, the contents of the inhibitor added is usually from 10 to 5000 ppm by weight, preferably from 10 to 1000 ppm by weight, and more preferably from 50 to 500 ppm by weight.

There is no particular limit on the polymerization inhibitors used in the present invention, it can be any known polymerization inhibitors. Unrestricted examples of the suitable inhibitor are: N-oxyl compounds such as tert-butyl nitroxide, 2,2,6,6-tetramethyl-4-hydroxypiperidyl-1-oxyl, 2,2,6,6-tetramethylpiperidyl-1-oxyl, 2,2,5,5-tetramethyl-1-oxyl-pyrrolidine, 2,2,6,6-tetramethylpiperidino-oxyl and 4-hydroxy-2, 2,6,6-tetramethylpiperidino-oxyl; phenol compounds such as hydroquinone, methoquinone, pyrogallol, catechol and resorcin; phenothiazine compounds such as phenothiazine, 3,7-dioctyl phenothiazine and bis-(α-dimethylbenzyl)phenothiazine; and copper compounds such as cupric chloride, copper acetate, copper carbonate, copper acrylate, copper dimethyldithiocarbamate, copper diethyldithiocarbamate and copper dibutyldithiocarbamate, as well as manganese salt, etc.

The method of the present invention further comprises a step of controlling the temperature of the fed vinyl compound liquor according to the operation pressure of the rectification column so that such a temperature is in the rang of from the bubble point of the liquor under the operation pressure to 10° C. lower than the bubble point.

The method for controlling the temperature of the fed vinyl compound has no particular limit, it can be any conventional method used in the art. For example, the temperature of the fed vinyl compound liquor can be controlled by an electrical heater.

The rectification method of the present invention controls the temperature of the fed vinyl compound liquor according to the operation pressure of rectification column such that the temperature is in the range of from the bubble point of the liquor to be rectified to 10° C. lower than the bubble point. As a result, the spontaneous polymerization of the vinyl compound has been reduced markedly and the operation period has been extended.

In one embodiment of the prevent invention, the vinyl compound liquor to be rectified comprises from 40 to 95% by weight, preferably from 60 to 92% by weight, and more preferably from 80 to 90% by weight of methyl (meth)acrylate and remaining impurities, it further comprises, based on the weight of the liquor, from 10 to 5000 ppm by weight, preferably from 10 to 1000 ppm by weight, and more preferably from 50 to 500 ppm by weight of inhibitor(s). While keeping the operation pressure of the rectification column in the range of from 1 to 80 kpa, preferably from 30 to 70 kpa, and more preferably from 45 to 60 kpa, the method of the present invention heats the methyl (meth)acrylate liquor to a temperature of from 40 to 130° C., preferably from 50 to 120° C., and more preferably from 60 to 110° C., such that the temperature falls in the range of from the bubble point of the liquor under the operation pressure to 10° C. lower than the bubble point, preferably from the bubble point of the liquor under the operation pressure to 7° C. lower than the bubble point, and more preferably from the bubble point of the liquor under the operation pressure to 4° C. lower than the bubble point, and then adds the heated methyl (meth)acrylate liquor into the rectification column operated under said operation pressure. Finally, the rectification column is not clogged caused by the spontaneous polymerization of the vinyl compound even after operation for over 30 days.

To further explain the prevent invention, the following examples are provided.

EXAMPLE 1

1. Providing a Methyl Acrylate Liquor 24 kmol of acrylic acid and 24 kmol of methanol were mixed and preheated to 70° C., the mixture obtained was added into a 15.7 stere reactor (SHB-1, obtained from shanghai huayi acrylic acid co., Ltd.), which reactor was a fixed bed reactor and filled with an acidic catalyst. The mixture proceeded a reaction and released heat at the present of the catalyst, the reaction temperature was controlled at 75° C. to obtain a product comprising methyl acrylate and water. After washing and separating off unreacted alcohol, the vinyl compound liquor was obtained.

The purity of the obtained liquor is determined by gas chromatography and the concentration of the methyl acrylate is 95 wt %.

150 ppm by weight, based on the total liquor obtained, of an inhibitor, hydroquinone monomethyl ether, was added into the liquor, forming a vinyl compound liquor to be rectified.

2. Estimating the Bubble Point of the Liquor

According to the formula disclosed in *the chemical engineer handbook* (machine industry press)

$$\sum_{i=1}^{c} zi = 1$$

$$yi = Kizi$$

$$\sum_{i=1}^{c} yi = 1$$

estimating the bubble point according to the method of Newton Iterative:

$$F_b(T) = \sum_{i=1}^{c} Kizi - 1 = 0$$

$$T_{n+1} = T_n - F_b(T_n)/F'_b(T_n)$$

The bubble point of the methyl acrylate liquor was about 68.38° C. under the pressure of 60 kpa.

3. Rectification

The above methyl acrylate liquor was fed into a rectification column (SHB-1, obtained from shanghai huayi acrylic acid co., ltd) at a feed rate of 2200 Kg/h, the temperature of the fed liquor was 66° C. At the column head, the flow rate was about 2000 Kg/h. Since the present invention employed a method for feeding the liquor around its bubble point, according to the relationship between the saturated vapor pressure and the temperature of the fed methyl arylate, the pressure in the top of the column was set to 60 Kpa, the bottom temperature of the column was 65° C. After operation for 30 days, the pressure in the column was not found to have been increased, which manifested that no obvious spontaneous polymerization occurred. Then the flow rate was increased, and the bottom temperature of the column was correspondingly increased to be 110° C., the rectification column could still operate stably without obvious spontaneous polymerization being observed.

EXAMPLE 2

1. Providing an Ethyl Methacrylate Liquor 24 kmol methacrylic acid and 24 kmol ethanol were mixed and pre-heated to 70° C. The heated mixture was added into a 15.7 stere reactor (SHB-1, obtained from shanghai huayi acrylic acid co. Ltd.), which reactor is a fixed bed reactor, and filled with an acidic catalyst. The mixture proceeded a reaction and released heat at the present of the catalyst, the reaction temperature was controlled at 75° C. to obtain a reaction product comprising ethyl methacrylate and water. After washing and separating off unreacted alcohol, the ethyl methacrylate liquor is obtained.

The purity of the obtained liquor was determined by gas chromatography, and the concentration of the ethyl methacrylate was 97.5% by weight. 150 ppm by weight, based on the total weight of the liquor obtained, of an inhibitor, hydroquinone monomethyl ether, was added into the liquor, forming an vinyl compound liquor to be rectified.

2. Estimating the Bubble Point of the Liquor

According to the formula disclosed in *the chemical engineer handbook* (machine industry press)

$$\sum_{i=1}^{c} zi = 1$$

-continued $$y_i = K_i z_i$$

$$\sum_{i=1}^{c} y_i = 1$$

estimating the bubble point according to the method of Newton Iterative:

$$F_b(T) = \sum_{i=1}^{c} K_i z_i - 1 = 0$$

$$T_{n+1} = T_n - F_b(T_n)/F'_b(T_n)$$

The bubble point of the ethyl methacrylate liquor was about 71.29° C. under the pressure of 65 kpa.

3. Rectification

The above ethyl methacrylate liquor was fed into a rectification column (SHB-1, obtained from shanghai huayi acrylic acid co. Ltd) at a feed rate of 2200 Kg/h, the temperature of the fed liquor was 66° C. At the column head, the flow rate was about 2000 Kg/h. Since the present invention employed a method for feed the liquor around its bubble point, according to the relationship between the saturated vapor pressure and the temperature of the fed ethyl methacrylate, the pressure in the top of the column was set to 65 Kpa, the bottom temperature of the column was 67° C. After operation for 30 days, the pressure in the column was not found to have been increased, which manifested that no obvious spontaneous polymerization occurred. Then the flow rate was increased, and the bottom temperature of the column was correspondingly increased to be 110° C., a small amount of the polyethylmethacrylate was found.

COMPARATIVE EXAMPLE 1

This Comparative Example Rectifies the Vinyl Compound Liquor by Feeding Same at a Temperature of its Dew Point According to the formula disclosed in *the chemical engineer handbook* (machine industry press), the dew point of the vinyl compound liquor to be rectified in example 1 was 66.28° C. under the pressure of 25 kpa.

The procedures of Example 1 was repeated except the rectification column operated under a pressure of 25 kpa and the temperature of the liquor to be added was around its dew point, 66° C. On operating for less than 14 days, a great deal of polymethacrylate has been found, so the rectification process has to be interrupted to labor removal the polymer.

COMPARATIVE EXAMPLE 2

This Comparative Example Rectifies the Vinyl Compound Liquor by Feeding Same at a Temperature of its Dew Point According to the formula disclosed in the chemical engineer handbook (machine industry press), the dew point of the vinyl compound liquor to be rectified in example 2 was 71.03° C. under the pressure of 30 kpa.

The procedures of Example 2 was repeated except the rectification column operated under a pressure of 30 kpa and the temperature of the liquor to be added was around its dew point, 66° C., under said pressure. On operating for less than 20 days, a great deal of polyethylmethacrylate has been found, so the rectification process has to be interrupted to labor remove the polymer.

What is claimed is:

1. A method for rectifying a vinyl compound liquor, comprising:
    a) providing a rectification column operated at a temperature of from 40 to 130° C. and a pressure of from 1 to 80 kPa;
    b) feeding the vinyl compound liquor into the rectification column, which is heated by the operating temperature of the rectification column in a), when an overhead output in the rectification column is more than a bottom discharge, said vinyl compound liquor comprises a vinyl compound, said vinyl compound is one selected from the group consisting of (meth)acrylic acid, (meth)acrylate salt and (meth)acrylic esters; wherein
    the temperature of said fed vinyl compound liquor is controlled to be in a range of from its bubble point at the pressure of said rectification column to 10° C. lower than said bubble point, so that the rectification column is not clogged caused by spontaneous polymerization of the vinyl compound.

2. The method according to claim 1, wherein the temperature of said fed vinyl compound liquor is controlled to be in the range of from its bubble point at the pressure of said rectification column to 7° C. lower than said bubble point.

3. The method according to claim 2, wherein the temperature of said fed vinyl compound liquor is controlled to be in the range of from its bubble point at the pressure of said rectification column to 4° C. lower than said bubble point.

4. The method according to claim 1, wherein the rectification column operates under the pressure of from 30 to 70 kPa.

5. The method according to claim 4, wherein the rectification column operates under the pressure of from 45 to 60 kPa.

6. The method according to claim 1, wherein said vinyl compound liquor comprises from 40 to 95% by weight of the vinyl compound and remains of impurities, as well as an inhibitor in an amount of from 50 to 500 ppm by weight of said vinyl compound liquor.

7. The method according to claim 1, wherein the rectification column operates in a temperature of from 50 to 120° C.

8. The method according to claim 7, wherein the rectification column operates in a temperature of from 60 to 100° C.

* * * * *